US009180824B1

United States Patent
Rodriguez et al.

(10) Patent No.: US 9,180,824 B1
(45) Date of Patent: Nov. 10, 2015

(54) AUTOMOTIVE FINISH PROTECTION AND DENT PREVENTION SYSTEM

(71) Applicants: David Rodriguez, Orlando, FL (US); Oscar Merced, Staten Island, NY (US)

(72) Inventors: David Rodriguez, Orlando, FL (US); Oscar Merced, Staten Island, NY (US)

( * ) Notice: Subject to any disclaimer, the term of this patent is extended or adjusted under 35 U.S.C. 154(b) by 0 days.

(21) Appl. No.: 14/199,403

(22) Filed: Mar. 6, 2014

(51) Int. Cl.
*B60R 13/00* (2006.01)
*B60R 13/04* (2006.01)
*B60R 19/38* (2006.01)

(52) U.S. Cl.
CPC ................. *B60R 13/04* (2013.01); *B60R 19/38* (2013.01)

(58) Field of Classification Search
CPC ........ B60R 19/40; B60R 19/34; B60R 19/38; B60R 19/18; B60R 13/04
USPC ........................................ 293/118, 128, 4, 21
See application file for complete search history.

(56) References Cited

U.S. PATENT DOCUMENTS 2,512,527 A * 6/1950 Hoffman ....................... 293/118
D299,819 S 2/1989 Katz et al.
5,004,281 A 4/1991 Yamazaki
5,518,283 A 5/1996 Egelske
D387,722 S 12/1997 Fujinaka
D485,528 S 1/2004 Gray
6,726,260 B1 4/2004 Wang et al.
D508,222 S 8/2005 Tekavec
7,077,440 B1 7/2006 Morales et al.
7,354,083 B1 * 4/2008 Obermann .................... 293/128
8,235,432 B2 8/2012 Ryan et al.
2007/0018475 A1 1/2007 McGinnis et al.

* cited by examiner

*Primary Examiner* — Joseph D Pape
*Assistant Examiner* — Dana Ivey
(74) *Attorney, Agent, or Firm* — Goldstein Law Office, P.C.

(57) ABSTRACT

A device and a system operative for protecting an automobile door from dent and damage to the finish. The device has a shield that stows in a chamber in an automobile frame below an automobile door, the shield deploying upwardly from the chamber to a position adjacent to the automobile door. The shield is deployed by a hydraulic system coupled to the shield through a plurality of linkages on a track that deploys the shield out the chamber opening and retracts the shield into the chamber. The system has an actuator for actuating the hydraulic system, the actuator selectively actuating the hydraulic system to deploy the shield when the door is locked and selectively actuating the hydraulic system to deploy the shield when is door is opening. A remote control device actuates the hydraulic system in one example embodiment. A sensor actuates the hydraulic system in another example embodiment.

20 Claims, 7 Drawing Sheets

AUTOMOTIVE FINISH PROTECTION AND DENT PREVENTION SYSTEM

TECHNICAL FIELD

The present disclosure relates generally to an automotive door protection device and system. More particularly, the present disclosure relates to a device and system for protecting the finish and preventing dents on the doors of an automobile.

BACKGROUND

Most people care about how the car they drive looks. That is evidenced by the vast number of sizes, shapes, colors and finishes available in the auto marketplace. Drivers can select how their looks down to the smallest detail.

People particularly cherish the finish on their new car, even if the new car was previously owned because for the owner, it is still a new car.

Other people are not so concerned about the finish—on other people's cars. They open their door into the side of a car parked alongside, causing scratches and dents. Sometimes pedestrians will bump into cars with shopping carts and hand trucks, causing damage. Thoughtless shoppers fail to return the carts to the corrals, letting them freely roll into parked cars.

Many install protective coverings for their bumpers to protect the bumpers when parallel parking or pulling into a garage space. Some put plastic covers on the edge of their doors to protect their own door edge as well as their neighbor's door.

Some put plastic covers over the door molding to stop the neighbor's door from hitting the side of the door. However, if the molding is not the most prominent feature of the door, only the molding is protected.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide an automotive finish protection and dent prevention system for protecting an automobile door. Accordingly, the present disclosure provides a shield that stows in a chamber in an automobile frame below an automobile door, the shield deploying upwardly from the chamber to a position adjacent to the automobile door.

Another aspect of an example embodiment in the present disclosure is to provide a shield that deploys to a position adjacent to the automobile door. Accordingly, the present disclosure provides a hydraulic system in the chamber for deploying said shield.

A further aspect of an example embodiment in the present disclosure is to provide a hydraulic system that deploys a shield when an automobile door is closed and locked and retracts the shield when the door is opening. Accordingly, the present disclosure provides an actuator for selectively actuating the hydraulic system, the actuator selectively actuating the hydraulic system to deploy the shield when the door is locked and selectively actuate the hydraulic system to deploy the shield when is door is opening.

Accordingly, the present disclosure describes a device and a system operative for protecting an automobile door from denting and damage to the finish. The device has a shield that stows in a chamber in an automobile frame below an automobile door, the shield deploying upwardly from the chamber to a position adjacent to the automobile door. The shield is deployed by a hydraulic system coupled to the shield through a plurality of linkages on a track that deploys the shield out the chamber opening and retracts the shield into the chamber. The system has an actuator for selectively actuating the hydraulic system, the actuator selectively actuating the hydraulic system to deploy the shield when the door is locked and selectively actuating the hydraulic system to deploy the shield when is the door is opening. A remote control device actuates the hydraulic system in one example embodiment. A sensor actuates the hydraulic system in another example embodiment.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

FIG. 1 is a dynamic perspective view of an automobile with an example embodiment of an automotive finish protection and dent prevention device installed.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 2:
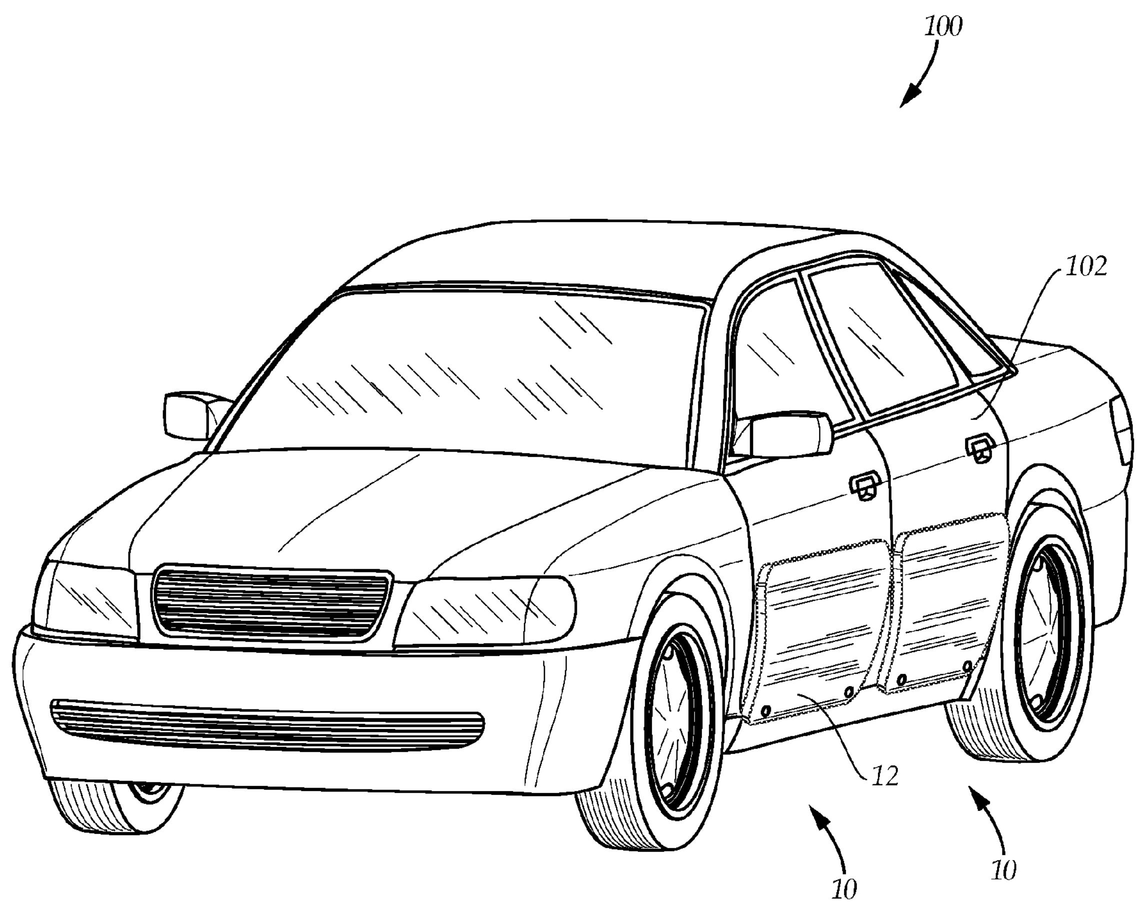
FIG. 2 is a dynamic perspective view of an automobile with another example embodiment of the automotive finish protection and dent prevention device installed.

FIG. 2 illustrates an example embodiment of an automotive finish protection and dent prevention device 10 deployed on an automobile 100, the device 10 adjacent to an automobile door 102. As illustrated in FIG. 2, an example embodiment of the device is shown, each automobile door 102 having a single device 10 associated with each door.

The device 10 has a shield 12 that deploys to protect the door 102 from damage caused by carelessness when the automobile is parked in a parking lot, garage or at curbside.

Figure 4:
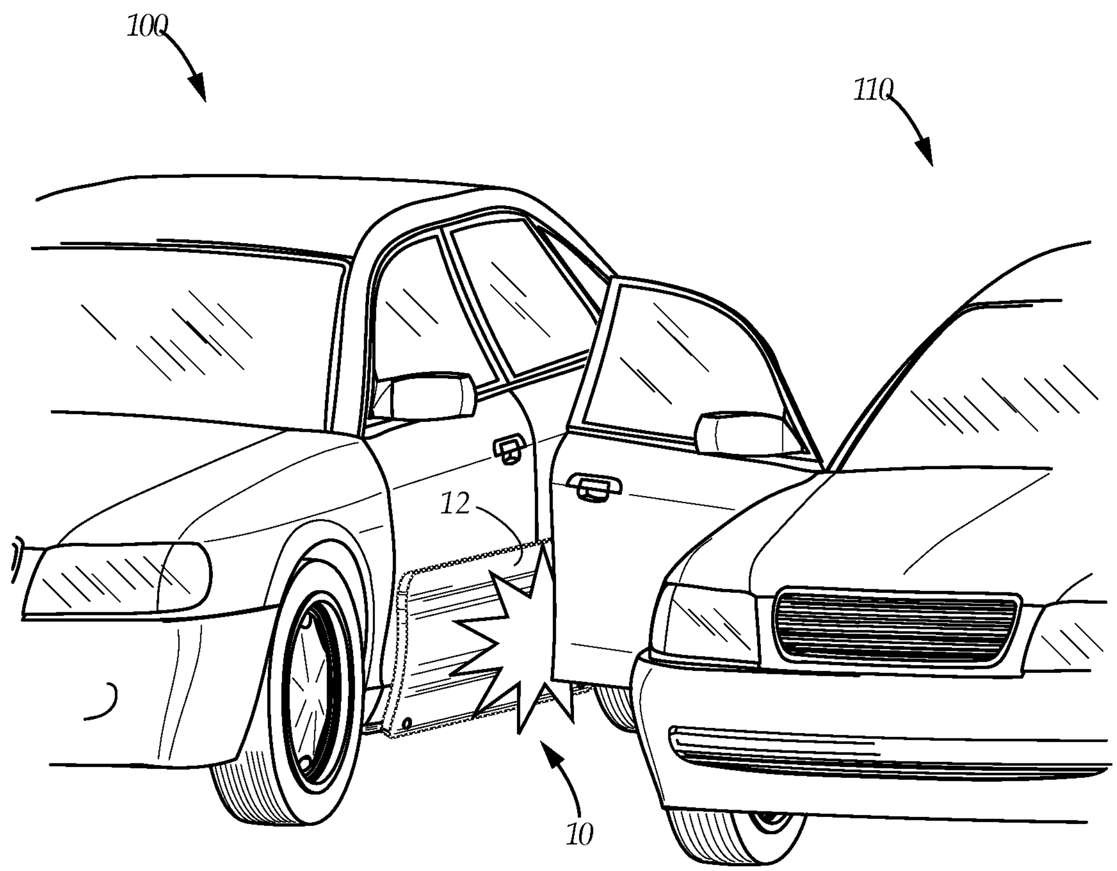
FIG. 4 is a dynamic perspective view of a first automobile with the example embodiment of an automotive finish protection and dent prevention device deployed, preventing damage to the first automobile by a door of a neighboring second automobile.

As shown in FIG. 4, the shield 12 of the device 10 is useful protection when the automobile 100 is in proximity to other vehicles 110 or when objects such as shopping carts or hand trucks crash into the door.

Figure 3A:
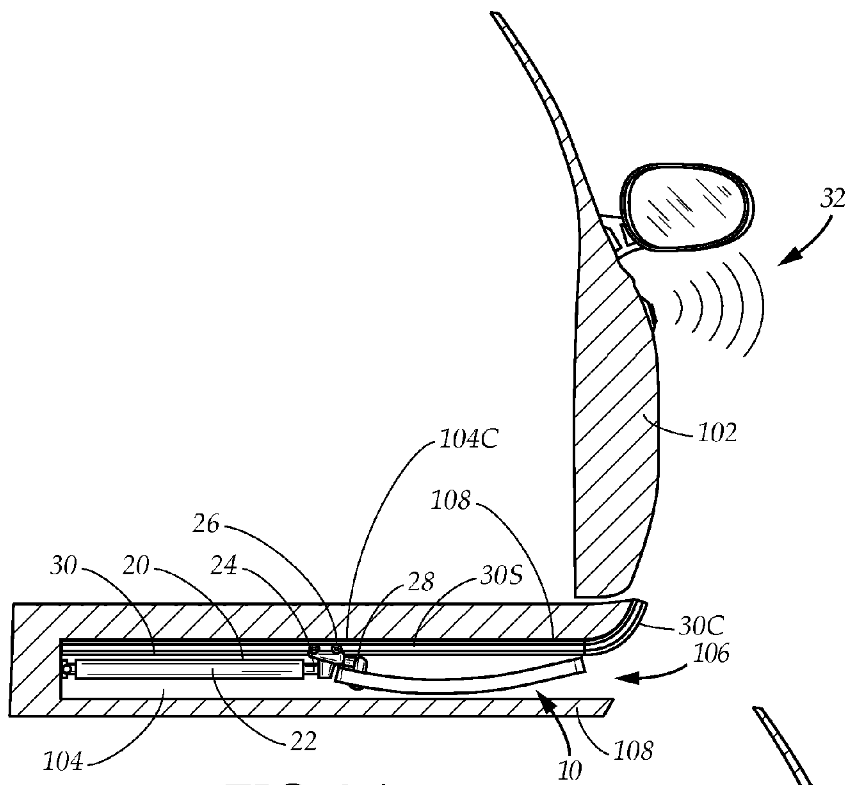
FIG. 3A is a cross-section view of an automobile frame and door with an example embodiment of the automotive finish protection and dent prevention device installed.
Figure 3B:
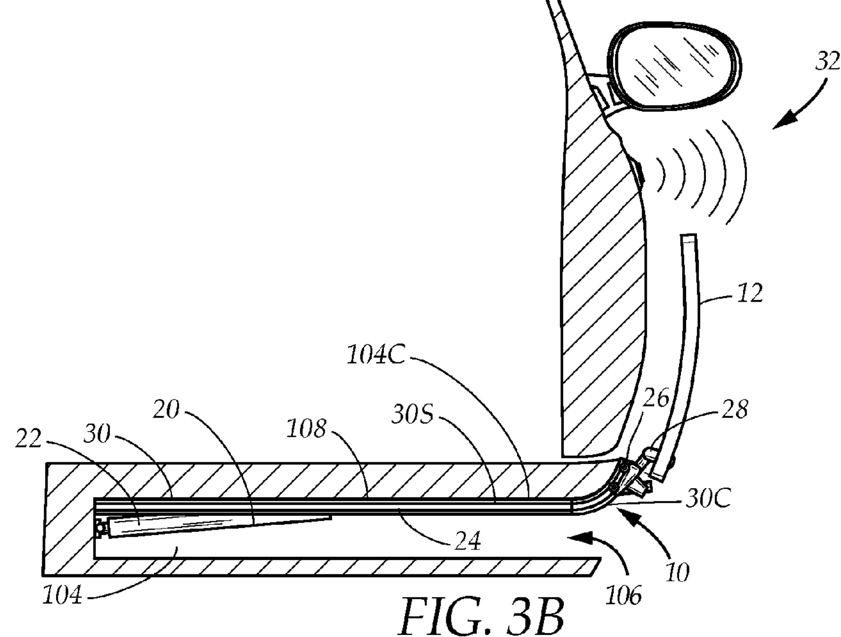
FIG. 3B is a cross-section view of an automobile frame and door with the example embodiment of the automotive finish protection and dent prevention device deployed.

FIGS. 3A and 3B also illustrate in cross-section, an example embodiment of an automotive finish protection and dent prevention system for protecting the automobile door 102. These illustrations show a single hydraulic system 20 but it is understood that more than one hydraulic system 20 can be used to deploy the shield 12 as well as other example embodiments of the shield disclosed hereinbelow.

FIG. 3A shows the device 10 stowed in a chamber 104 in an automobile frame 108 below the automobile door 102. The chamber 104 has an opening 106 below the door 102, the shield 12 of the device 10 deploying upwardly from the chamber 104.

FIG. 3B shows the shield 12 of the device 10 deployed in a position adjacent to the door 102. FIGS. 3A and 3B show a hydraulic system 20 for selectively deploying the shield 12 in the chamber 104. The hydraulic system 20 has a hydraulic cylinder 22 coupling to a plurality of linkages 26, the linkages traversing a track 30 in the chamber 104. The linkages 104 are coupled to the shield 12. The hydraulic cylinder 20 is operative for deploying the shield 12 by propelling the linkages along the track 30 in the chamber 104 towards the opening of the chamber 106, the linkages 26 traversing the chamber 104, thereby deploying the shield 12 out of the chamber 104 and in the position adjacent to the automobile door 102, the shield 12 operative for protecting the automobile finish and preventing denting to the automobile door 102.

The chamber has a ceiling 104C. The track 30 has a straight portion 30S coupled to the ceiling 104C. The track 30 has a curved portion 30C at the chamber opening 106, extending upwardly toward the automobile door 102. The straight track portion 30S and the curved track portion 30C connect to form a continuous track 30.

The shield 12 is hingedly coupled to the linkages 26 by a hinged joint 28. The hydraulic cylinder 22 has a piston rod 24 coupled to the linkages, the piston rod 24 deploying the shield 12 by propelling the linkages 26 along the straight portion 30S and the curved portion 30C of the track 30, deploying the shield 12 out of the chamber 104, the shield 12 swiveling on the hinge 28 when the linkages 26 are on the curved portion 30C of the track 30, the shield 12 moving into the position adjacent to the automobile door 102.

Figure 1:
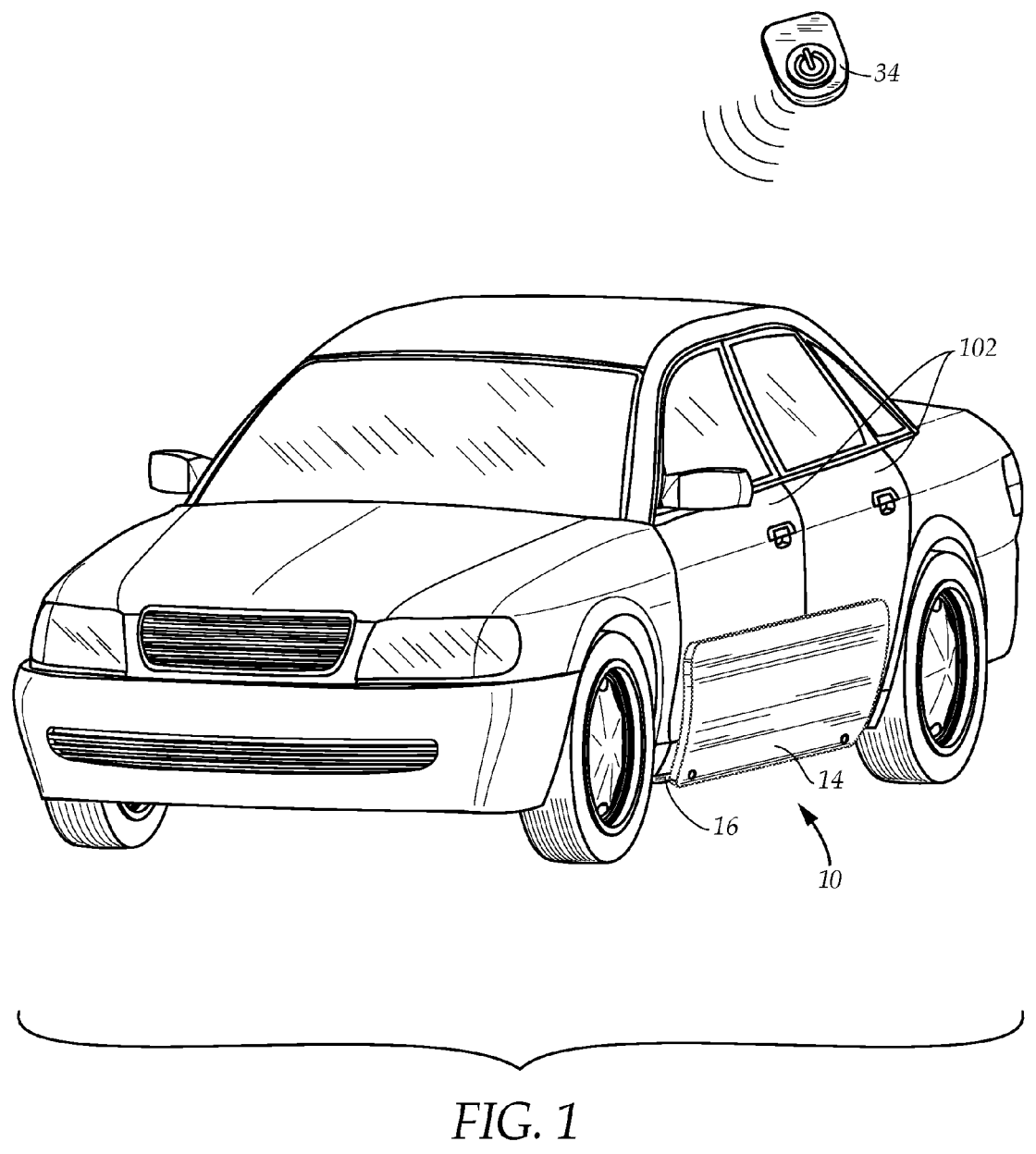

FIG. 1 shows a further example embodiment of the automotive finish protection and dent prevention device 10 deploying adjacent to side-by-side automobile doors 102. As illustrated in FIG. 1, the automobile doors 102 have a single device 10 associated with both doors, the device having a wide shield 14 that extends and covers the side-by-side doors 102. The wide shield 14 extends from a wide chamber having a wide opening 16 that extends along the side-by-side doors. The device has at least one hydraulic system which is not shown in the present view. It is understood by those of ordinary skill that the single shield 14, or the multiple shields 12 illustrated in FIG. 2 are possible for automobiles that have at least two side-by-side doors. It is also understood that a shield 12 may require more than one hydraulic systems.

FIG. 1 also illustrated an actuator, the actuator in this example embodiment a remote control device 34 operative for selectively actuating the hydraulic system. It is understood that the remote control device is operative for deploying and retracting the wide shield 14 in FIG. 1 as well as the shields 12 illustrated in FIG. 2. Similarly, the sensor 32 illustrated in FIG. 2 is operative for deploying and retracting the shields 12 in FIG. 2 as well as the wide shield 14 in FIG. 1.

Referring again to FIGS. 3A and 3B, the system includes the shield 12 and hydraulic system 20 as described hereinabove. The system further includes a sensor 32, the sensor being the actuator in this example embodiment, the actuator operative for selectively actuating the hydraulic cylinder 22 of the hydraulic system 20, the hydraulic cylinder thereby deploying the shield 12 out of the chamber 104 and in the position adjacent to the automobile door 102. Correspondingly, the actuator is operative for actuating the hydraulic cylinder 22 for retracting the shield 12 into the chamber 104.

In one example embodiment, the sensor 32 is the actuator that detects when the automobile door 102 is closed and locked or open and unlocked. In the drawing, the sensor 32 is symbolized by a wireless communication icon. The hydraulic cylinder 22 is actuated by the sensor 32.

FIG. 1 also illustrates an example embodiment of the actuator which is a remote control device 34 operative for selectively actuating the hydraulic system. It is understood that the remote control device is operative for deploying and retracting the wide shield 14 in FIG. 1 as well as the shields 12 illustrated in FIG. 2. Similarly, the sensor 32 illustrated in FIG. 2 is operative for deploying and retracting the shields 12 in FIG. 2 as well as the wide shield in FIG. 1.

It is understood by those of ordinary skill that wireless sensors for detecting open and unlocked doors are well known and that discussion of the types and placement of sensors and methods of sensor communication is beyond the scope of this disclosure.

As described hereinabove, the system can include a wide shield 14, operative for protecting both doors 102 in the pair of side-by-side automobile doors 102.

As discussed hereinabove and illustrated in FIGS. 3A and 3B, the system includes the chamber ceiling 104C and the continuous track 30, the straight track portion 30S and the curved track portion 30C connecting to form the continuous track 30 coupled to the chamber ceiling 104C.

The system includes the hydraulic cylinder 22 having a piston rod 24 coupled to the linkages 26, the piston rod 24 deploying the shield 12, the shield swiveling on a hinge 28 when the linkages are on curved portion 30C of the track 30 as explained hereinabove.

Figure 6:
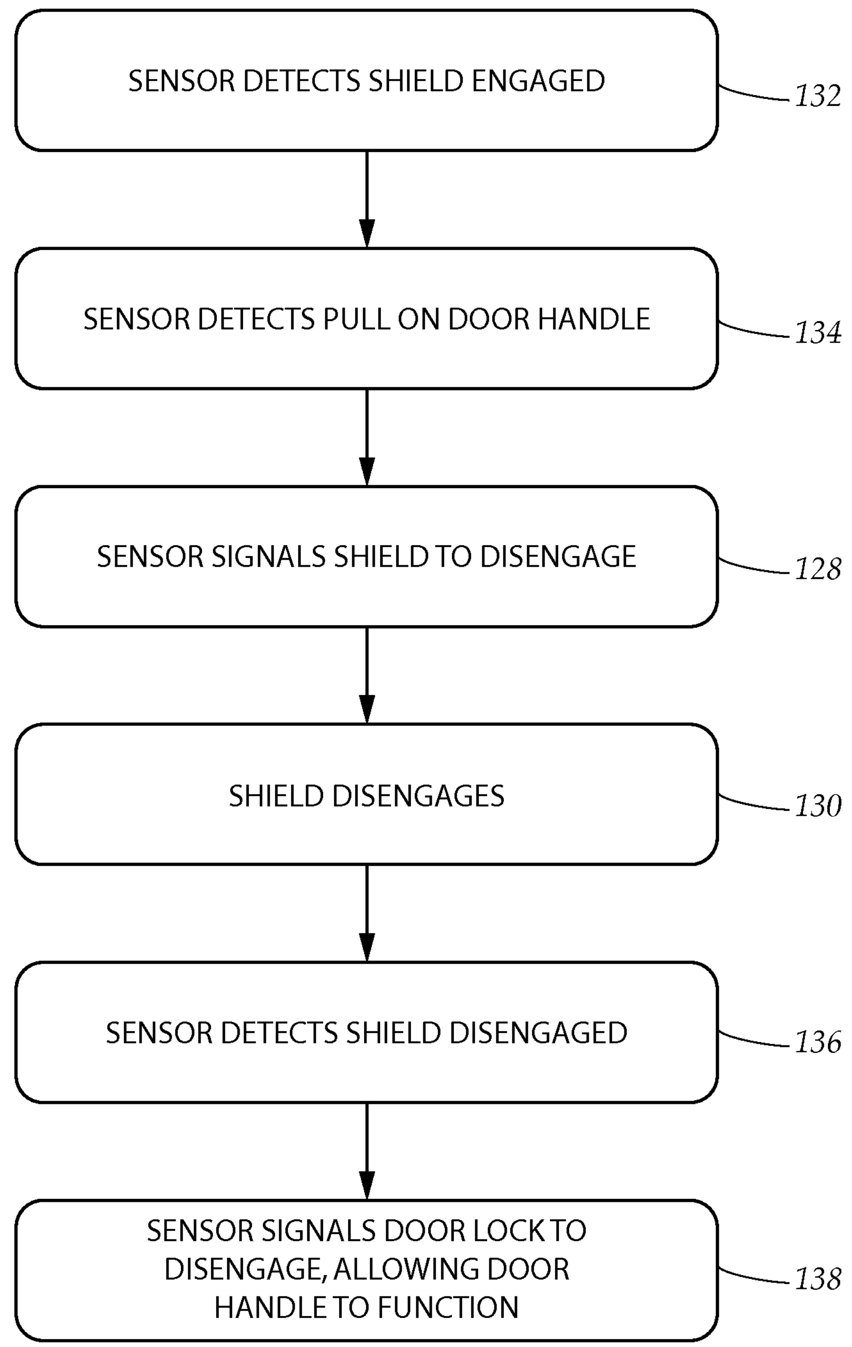
FIG. 6 is a block diagram showing the steps of receding the automotive finish protection and dent prevention device in the system.
Figure 7:
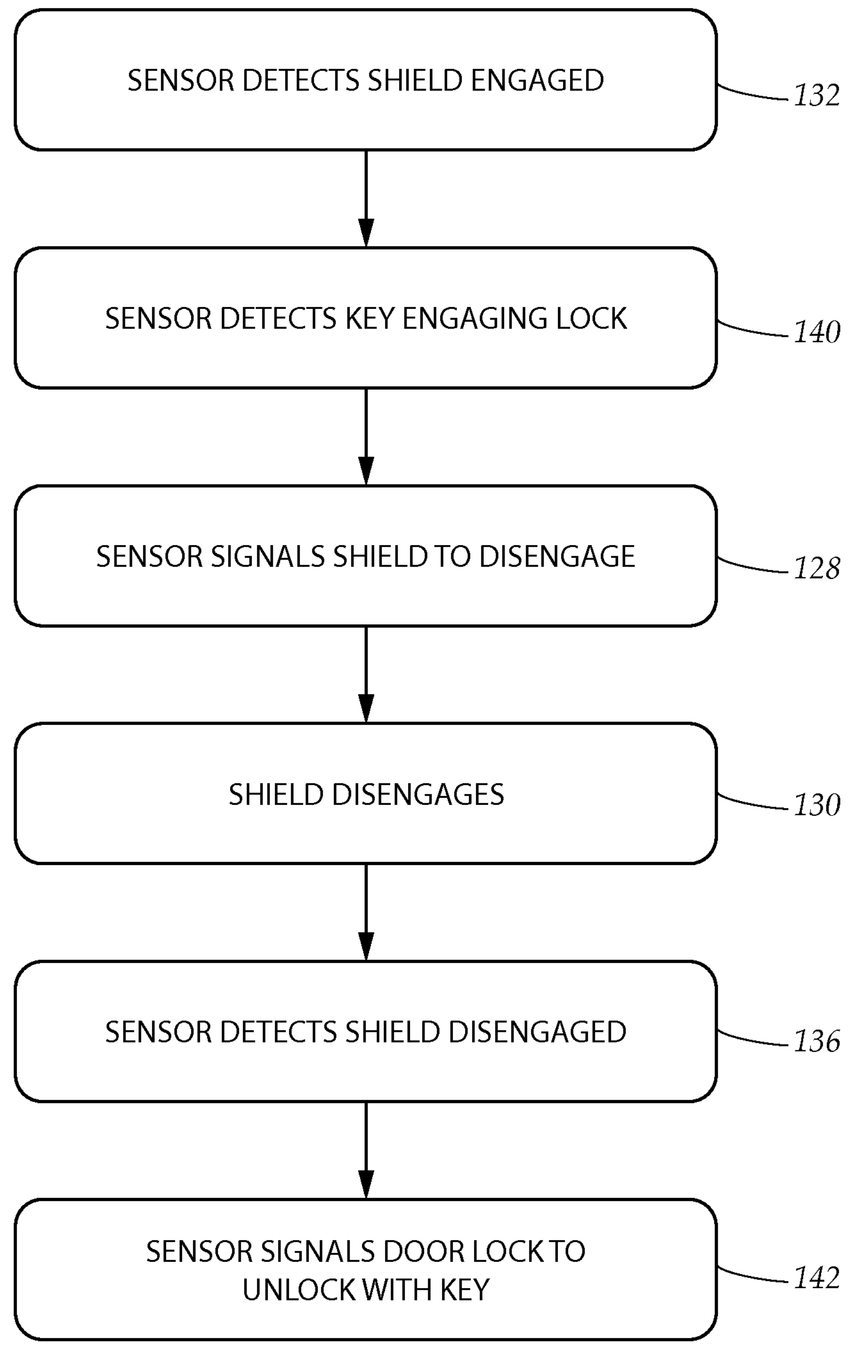
FIG. 7 is a block diagram showing the steps of receding the automotive finish protection and dent prevention device in the system when the automobile is parked and locked.

Example embodiments of how the system engages and disengages the shield using the sensor as the actuator are shown in FIGS. 6 and 7. FIG. 6 shows in one example embodiment, the sensor detecting the shield engaged 132. The sensor detects a pull on a door handle 134. The sensor sends signals to the hydraulic system to disengage the shield 128. The shield disengages 130 as described hereinabove and the sensor detects that the shield is disengaged 136 and releases the door lock so that the key can open the lock 138.

FIG. 7 shows in one example embodiment the sensor detecting the shield engaged 132. The sensor detects a key, the key includes a mechanical key, a key pad or an electronic key as non-limiting example, engaging the lock to unlock and open the door 140. The sensor sends signals to the hydraulic system to disengage the shield 128. The shield disengages 130 as described hereinabove and the sensor detects that the shield is disengaged 136 and releases the door lock so that the key can open the lock 142.

Figure 5:
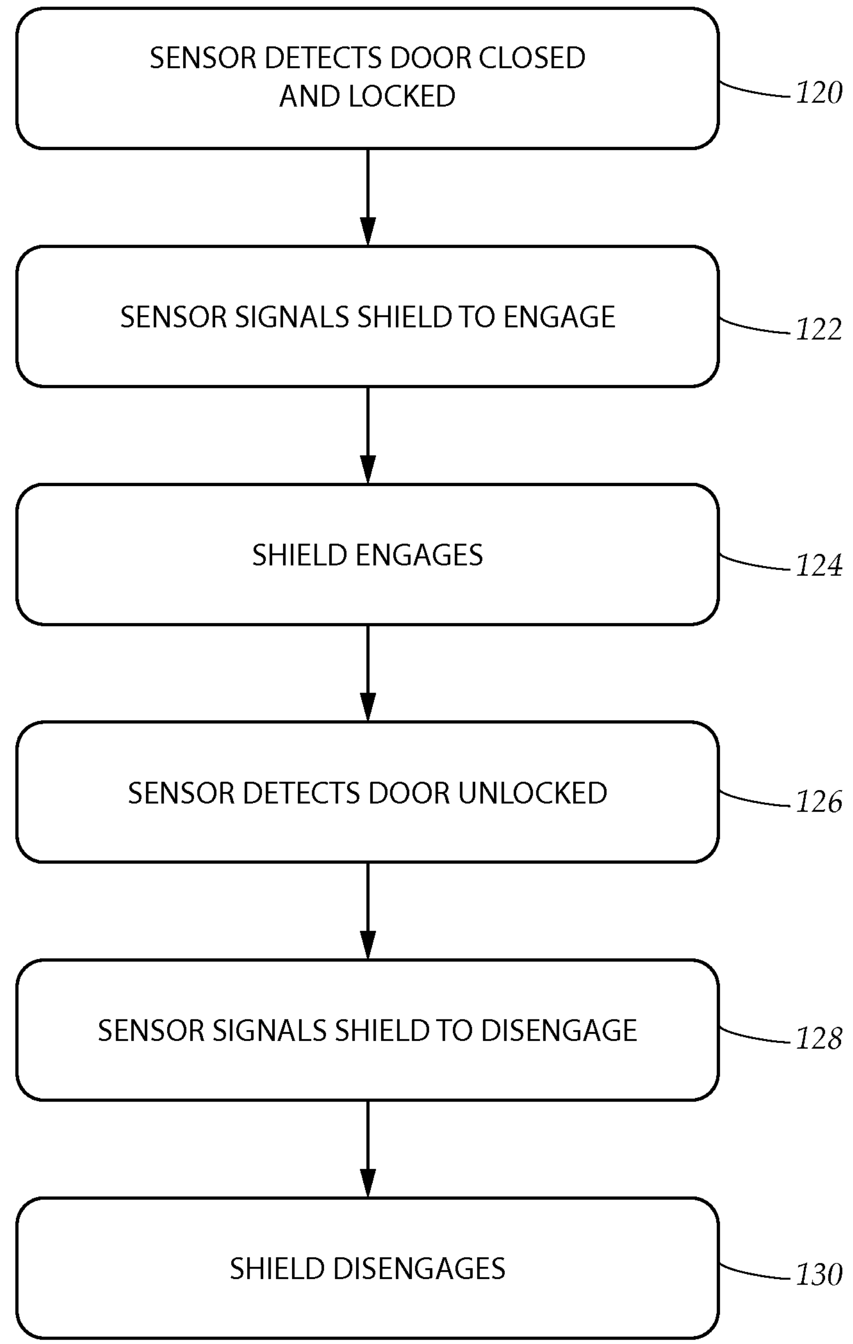
FIG. 5 is a block diagram showing the steps of deploying the automotive finish protection and dent prevention device in the system.

FIG. 5 demonstrates a method for protecting an automobile door from dents and finish damage. The sensor detects that the automobile door is closed and locked 120. The sensors signals the hydraulic system in the chamber in the automobile frame below the automobile door to deploy the shield 122. The shield is stowed in the chamber in the automobile frame as described hereinabove. The shield engages by deploying upwardly from the opening in the chamber to a position adjacent to the automobile door 124. The hydraulic cylinder is electrically coupled to a battery in the automobile.

The sensor detects that the automobile door is unlocked and opening 126. The sensor signals the hydraulic system to disengage the shield 128 and the shield disengages and stows in the chamber.

When the hydraulic system 20 receives a signal to deploy the shield 12 as shown in FIG. 3A and FIG. 3B, the linkages 26 coupling to the piston rod 24 of a hydraulic cylinder 22 in the hydraulic system 20, the linkages 26 further coupling to the shield 12, the piston rod 24 extending the linkages, the linkages 26 traversing the track 30 on the chamber 104 ceiling 104C, propelling the linkages 26 along the track 30 in the chamber 104, the shield 12 deploying upwardly from the opening 106 in the chamber 104.

When the hydraulic system 20 receives a signal to retract the shield 12, the piston rod 24 retracts into the hydraulic cylinder 22 thereby retracting the linkages 26 along the track 30 in the chamber 104, the shield 12 retracting through the opening 106 in the chamber 104.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented an automotive finish protection and dent prevention device. The disclosure is illustrated by example in the drawing figures, and throughout the written description. It should be understood that numerous variations are possible, while adhering to the inventive concept. Such variations are contemplated as being a part of the present disclosure.

What is claimed is:

1. An automotive finish protection and dent prevention device, comprising:

a shield, said shield stowing in a chamber in an automobile frame, said chamber having an opening below an automobile door, said shield deploying upwardly from the opening in the chamber to a position adjacent to the automobile door; and a hydraulic system selectively deploying said shield when said automobile door is closed and locked, the hydraulic system in said chamber in the automobile frame below the automobile door, said hydraulic system having a hydraulic cylinder coupling to a plurality of linkages, said plurality of linkages traversing a track in said chamber, said plurality of linkages coupled to said shield, said hydraulic cylinder operative for deploying said shield by propelling said plurality of linkages along said track in said chamber towards the opening of said chamber, said plurality of linkages traversing said chamber, thereby deploying said shield out of said chamber in the position adjacent to the automobile door, the shield operative protecting an automobile finish and preventing denting to the automobile door when the shield is thus deployed.

2. The device as described in claim 1, wherein the shield is a wide shield, having a width of a pair of side-by-side automobile doors, said wide shield operative for protecting said pair of automobile doors.

3. The device as described in claim 2, wherein said chamber has a wide opening operative for accommodating said wide shield, said chamber extending below the pair of side-by-side automobile doors.

4. The device as described in claim 1, wherein said chamber has a ceiling, and said track has a straight portion, said straight portion coupled to said ceiling chamber.

5. The device as described in claim 4, wherein said track has a curved portion at the chamber opening, said track continuous, said straight portion of said track connecting to said curved portion of the said track.

6. The device as described in claim 5, wherein said shield is hingedly coupled to said linkages.

7. The device as described in claim 6, wherein said hydraulic cylinder has a piston rod coupled to said linkages, said piston rod deploying said shield by propelling said linkages along said straight portion and said curved portion of said track, deploying said shield out of said chamber, said shield swiveling on a hinge when said linkages are on curved portion of said track, said shield moving into the position adjacent to the automobile door.

8. The device as described in claim 7, wherein the hydraulic cylinder is selectively actuated by a remote control device.

9. The device as described in claim 7, wherein the hydraulic cylinder is selectively actuated by a sensor that detects when the automobile door is closed and locked.

10. An automotive finish protection and dent prevention system for protecting an automobile door, comprising:

a shield, said shield stowing in a chamber in an automobile frame, said chamber having an opening below an automobile door, said shield deploying upwardly from the opening in the chamber to a position adjacent to the automobile door;

a hydraulic system for deploying said shield, said hydraulic system in said chamber in the automobile frame below the automobile door, said hydraulic cylinder electrically coupling to a battery in the automobile, said hydraulic system having a hydraulic cylinder coupling to a plurality of linkages, said linkages traversing a track in said chamber, said linkages coupled to said shield, said hydraulic cylinder operative for deploying said shield by propelling said linkages along said track in said chamber, said linkages traversing said chamber; and an actuator, said actuator selectively actuating said hydraulic cylinder when the automobile door is closed and locked, said hydraulic cylinder thereby deploying said shield out of said chamber and in the position adjacent to the automobile door, the shield operative for protecting an automobile finish and preventing denting to the automobile door, said actuator selectively actuating said hydraulic cylinder when the automobile door is opening and unlocked, said hydraulic cylinder thereby retracting said shield into said chamber.

11. The system as described in claim 10, wherein said chamber has a ceiling, and said track has a straight portion, said straight portion coupled to said ceiling chamber, said track has a curved portion at the chamber opening extending upwardly toward the automobile door, said track continuous, said straight portion of said track connecting to said curved portion of the said track.

12. The system as described in claim 11, wherein said shield is hingedly coupled to said linkages.

13. The system as described in claim 12, wherein said hydraulic cylinder has a piston rod coupled to said linkages, said piston rod deploying said shield by propelling said linkages along said straight portion and said curved portion of said track, deploying said shield out of said chamber, said shield swiveling on a hinge when said linkages are on said curved portion of said track, said shield moving into the deployed position adjacent to the automobile door.

14. The system as described in claim 10, wherein the actuator is a remote control device.

15. The system as described in claim 10, wherein the actuator is a sensor that detects when the automobile door is closed and locked before deploying said shield.

16. The system as described in claim 15, wherein said sensor detects a key engaging a door lock on the automobile door and signals the hydraulic system to disengage said shield.

17. The system as described in claim 16, wherein said sensor detects said shield is disengaged and releases the door lock.

18. The system as described in claim 15, wherein said sensor detects a door handle on the automobile door engaging, said sensor signals the hydraulic system to disengage said shield.

19. The system as described in claim 18, wherein said sensor detects said shield is disengaged and releases the door lock, permitting the door handle to engage.

20. A method for protecting an automobile door from dents and finish damage, comprising:

signaling a hydraulic system to deploy a shield upon a sensor detecting an automobile door closing and locking, said shield stowing in a chamber in an automobile frame, said chamber having an opening below the automobile door, said shield deploying upwardly from the opening in the chamber to a position adjacent to the automobile door, said hydraulic system in said chamber in the automobile frame below the automobile door, said hydraulic cylinder electrically coupling to a battery in the automobile; and signaling the hydraulic system to disengage the shield and stow the shield in the chamber upon a sensor detecting an automobile door opening and unlocking.

* * * * *